(12) United States Patent
Huang

(10) Patent No.: US 8,573,099 B2
(45) Date of Patent: Nov. 5, 2013

(54) PORTABLE PIPE CUTTER

(76) Inventor: Wu Sheng Huang, Taichung (TW)

(*) Notice: Subject to any disclaimer, the term of this patent is extended or adjusted under 35 U.S.C. 154(b) by 195 days.

(21) Appl. No.: 13/079,514

(22) Filed: Apr. 4, 2011

(65) Prior Publication Data

US 2012/0247286 A1    Oct. 4, 2012

(51) Int. Cl.
*B23D 21/04* (2006.01)
*B23D 21/08* (2006.01)

(52) U.S. Cl.
USPC .................................................. 82/113

(58) Field of Classification Search
USPC ............... 82/113, 60, 76, 99.1; 30/101
See application file for complete search history.

(56) References Cited

U.S. PATENT DOCUMENTS

| 2,699,099 | A | * | 1/1955 | Robinson | 493/11 |
| 4,416,062 | A | * | 11/1983 | Cummings | 30/101 |
| 4,831,732 | A | * | 5/1989 | Garton | 30/101 |
| 5,088,196 | A | * | 2/1992 | Fukuda | 30/102 |
| 5,943,778 | A | * | 8/1999 | Alana | 30/101 |
| 6,357,119 | B1 | * | 3/2002 | Acerra | 30/102 |
| 6,581,499 | B2 | * | 6/2003 | Myers | 82/113 |
| 8,266,991 | B2 | * | 9/2012 | Thorson et al. | 82/76 |

* cited by examiner

*Primary Examiner* — Will Fridie, Jr.

(57) ABSTRACT

A pipe cutter comprises a disc knife set and a roller set disposed inside a main body, a driving assembly piercing through the main body and connected to the roller set with a rotating operation component disposed on the exterior of the main body, and a conversion module connecting the main body, driving assembly, and roller set which converts the rotation of the rotating operation component into the linear movement of the roller set to adjust the relative distance between the roller set and the disc knife of the disc knife set and thereby to adapt the pipe cutter to the cutting of metal pipes with different diameters.

4 Claims, 5 Drawing Sheets

PORTABLE PIPE CUTTER

BACKGROUND OF THE INVENTION

1. Field of the Invention

The present invention relates to a tool for cutting metal pipes and particularly to a portable pipe cutter which can be gripped and rotated bare-handedly to cut metal pipes.

2. Brief Description of the Related Art

Existing metal pipe cutters can be classified into two types—fixed-point operation type and portable type. A powered cutting tool and a pipe positioning device are usually disposed on the frame of a fixed-point operation pipe-cutting mechanism. This kind of pipe cutter is usually used when cutting hard metal pipes or those with big diameters. Its volume and weight inconvenience its removal, and therefore it is usually disposed at a fixed position.

Portable pipe cutters are usually used when cutting copper pipes, thin-walled metal pipes, or metal pipes with small diameters. Without any powered cutting tool disposed thereon, a portable pipe cutter is relatively smaller than a fixed-point operation pipe-cutting mechanism in volume and weight and can therefore be easily carried to any workplace for pipe cutting. This kind of pipe cutter usually includes an extended grip handle and an approximately U-shaped working part disposed at the end of the grip handle. The working part includes a fixed-rotating disc knife and a roller, therebetween metal pipes are restrained. Force is applied on the grip handle to rotate the pipe cutter, causing the disc knife to move along and cut the pipe wall. The extended grip handle disposed on the portable pipe cutter is still bulky, whereas the disc knife and roller disposed on fixed-point operation pipe-cutting mechanism are only applicable to pipes of a fixed size.

SUMMARY OF THE INVENTION

It is an object of this present invention to provide a portable pipe cutter which is easily gripped, easily rotated and operated bare-handedly, with a knife which automatically drives forward, with an adjustable pipe receiving space to adapt to metal pipes with diameters within a preset range, and with a firm grip on the metal pipes to facilitate and steady the cutting operation.

With the above objects in mind, the present invention is of a circular shape to facilitate gripping and rotating. It includes a pipe receiving space, therethrough metal pipes are placed and allowed to run through the pipe cutter. It also includes a disc knife and two rollers, therebetween metal pipes are restrained.

The disc knife moves and returns in a preset path under the action of a flexible component disposed in the pipe cutter. The disc knife can firmly bite into the surface of the metal pipe, cutting it off as the knife rolls and rotates. The action of the flexible component drives the disc knife deeper and deeper inside the pipe wall in the process of roll cut, achieving the objective of automatically driving the knife forward to perform the cutting.

The two rollers are disposed inside a roller base, which moves linearly under the control of a driving assembly. The linear movement of the roller base adjusts the relative distance between the rollers and the disc knife, adapting the pipe cutter to receive metal pipes with various diameters within a preset range.

The disc knife and two rollers in the present invention hold and restrain metal pipes steadily from three positioning points, with the knife driving steadily forward to perform cutting.

BRIEF DESCRIPTION OF THE DRAWINGS

A preferred embodiment of the present invention is illustrated in the accompanying drawings in which.

DETAILED DESCRIPTION OF THE INVENTION

Figure 1:
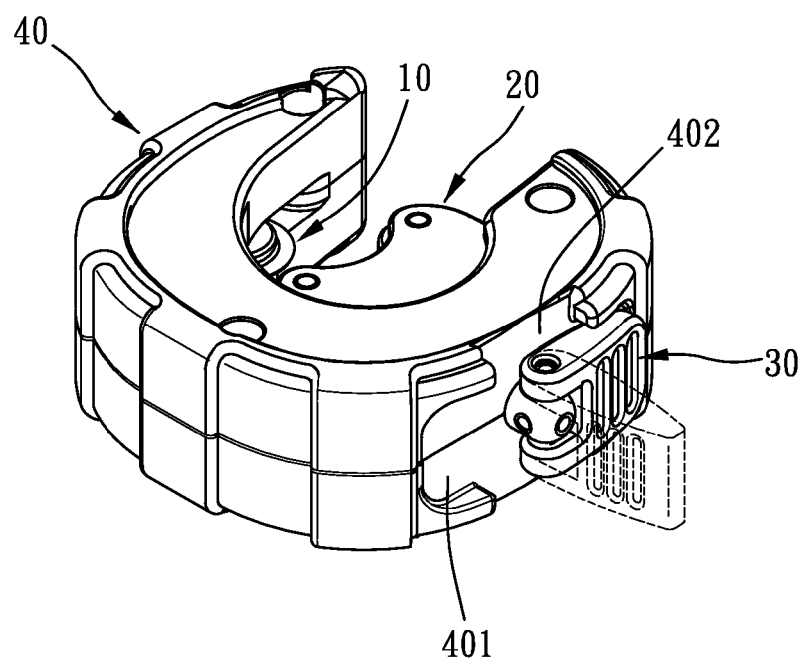
FIG. 1 is an assembled perspective view of the pipe cutter according to the present invention.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Referring first to FIGS. 1 to 4, the preferred embodiment of the pipe cutter according to the present invention includes a disc knife set 10, a roller set 20, a driving assembly 30, and a main body 40.

The disc knife set 10 includes a disc knife 11 and a knife axle 12 piercing through the center of the disc knife 11. The disc knife 11 and the knife axle 12 can freely rotate relative to each other.

The roller set 20 includes a roller base 21, two rotatable rollers 22 disposed in the front of the roller base 21, and a driving set joint 23 disposed at the back of the roller base 21. The driving set joint 23 is a screw threaded hole 231.

The driving assembly 30 includes a fixed-rotating shaft lever 31 and a rotating operation component 32 connected to one end of the fixed-rotating shaft lever 31. The other end of the fixed-rotating shaft lever 31 is an external screw threaded rod 311 piercing through the screw threaded hole 231 of the roller base 21.

The main body 40 includes a first casing body 41 and a matching second casing body 42. After being assembled, the two casing bodies form a pipe receiving space 43 in the middle. The main body 40 also includes an opening 45 connected to the pipe receiving space 43, allowing a metal pipe 50 to enter the pipe receiving space 43 through the opening 45. Inside both the first casing body 41 and the second casing body 42 are a knife axle guiding channel 48 and a roller base containing space 49.

Both ends of the knife axle 12 of the disc knife set 10 are placed into the knife axle guiding channel 48. The knife-edge of the disc knife 11 protrudes into the pipe receiving space 43 through the space reserved after the first casing body 41 and the second casing body 42 are assembled. One end of a flexible component 15 is fixed inside the main body 40, and the other end extends to touch the knife axle 12.

The roller base 21 is disposed inside the roller base containing space 49. The two rollers 22 and the disc knife 11 are opposite to each other horizontally. On the roller base 21 and inside the first casing body 41 or the second casing body 42 are disposed matching sets of slots 46 and guide blocks 24 for assembling. The slots 46 and the guide blocks 24 restrain the roller base 21 and keep it from rotating. The fixed-rotating shaft lever 31 pierces through the side wall of the main body 40 and connects with the roller base 21. The rotating operation component 32 is disposed outside the main body 40.

The roller base 21 bolted with the fixed-rotating shaft lever 31, together with the matching slots 46 and the guide blocks 24 make up the conversion module which converts the rotation of the rotating operation component 32 into the linear movement of the roller set 20.

Figure 5:
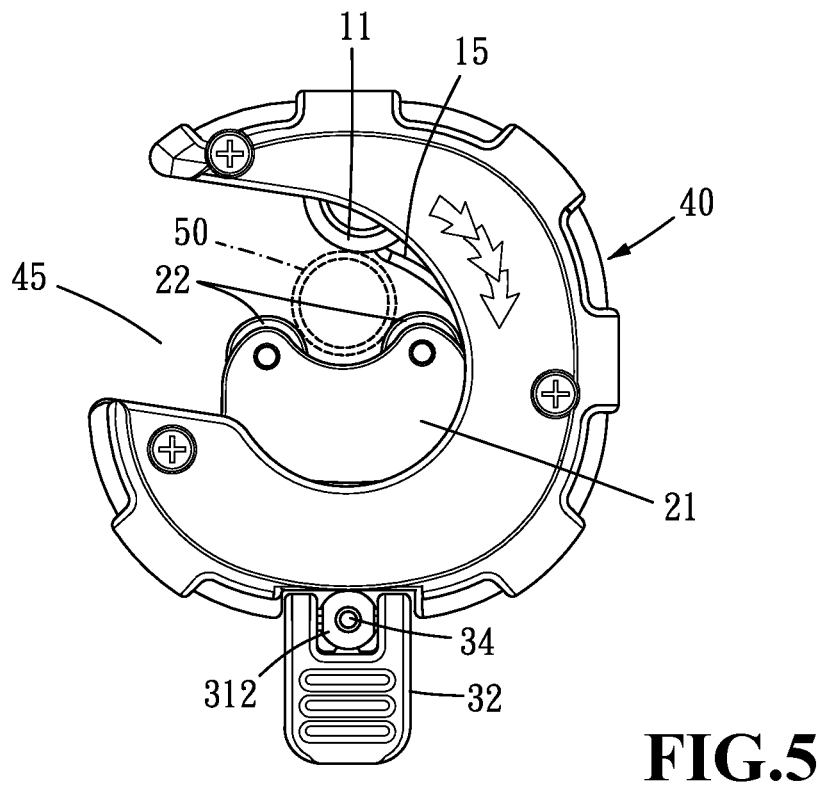
FIG. 5 is the second top view of the pipe cutter according to the present invention, showing the cutting operation on a metal pipe with a small diameter.
Figure 6:
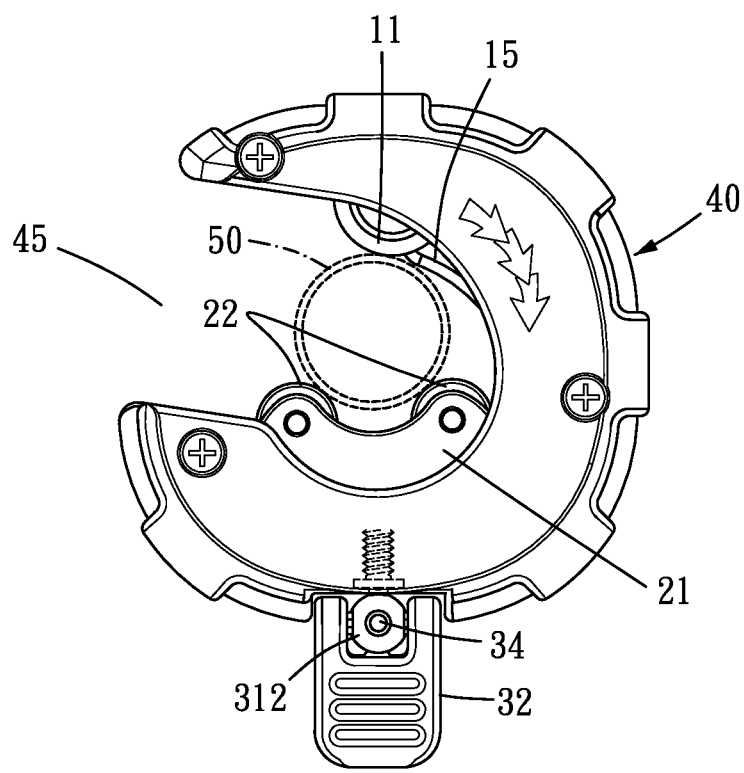
FIG. 6 is the third top view of the pipe cutter according to the present invention, showing the cutting operation on a metal pipe with a big diameter.

Referring now to FIGS. 5 and 6, turning the rotating operation component 32 makes the fixed-rotating shaft lever 31 to fixed-rotate, which causes the roller base 21 to move linearly, thereby changing the relative distance between the two rollers 22 and the disc knife 11. The metal pipe 50 enters or withdraws from the pipe receiving space 43 through the opening 45 of the pipe cutter, with its axle parallel to the axle of the pipe cutter. To facilitate the entry of the metal pipe 50 into the pipe cutter, it is necessary to adjust the roller base 21 backwards to increase the relative distance between the two rollers 22 and the disc knife 11. After the metal pipe 50 enters the pipe receiving space 43, the roller base 21 is adjusted forward so that the two rollers 22 and the disc knife 11 are in touch with the external wall of the metal pipe 50. After the rollers 22 touch the metal pipe 50, the roller base 21 is driven further forward to reinforce the grip and hold of the rollers 22 and the disc knife 11 on the metal pipe 50.

Affected by the counteraction force of the metal pipe 50, the disc knife 11 slightly recedes along the knife axle guiding channel 48 and compresses the flexible component 15, which stores the energy and produces a resilient thrust, causing the disc knife 11 to be even further engaged with the external wall of the metal pipe 50. At this juncture, the operator rotates the entire pipe cutter along the metal pipe 50 and causes the disc knife 11 and the two rollers 22 to move along the pipe wall of the metal pipe 50, with the disc knife 11 cutting the pipe wall. In the process of cutting, the flexible component 15 continues to release energy and exerts the resilient thrust even further on the knife axle 12, causing the disc knife 11 to cut gradually deeper inside the pipe wall until the metal pipe is completely cut through.

Figure 2:
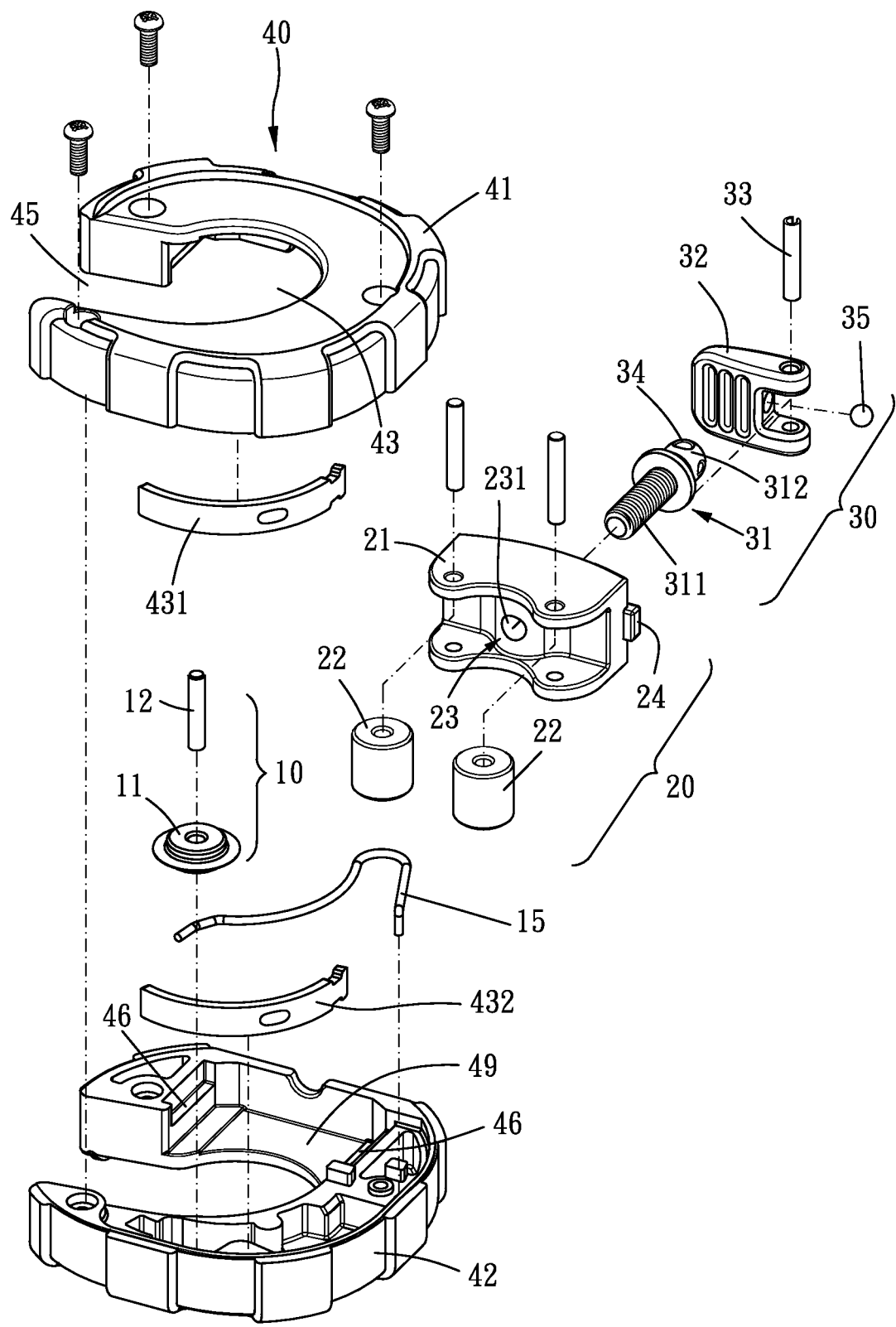
FIG. 2 is an exploded perspective view of the pipe cutter according to the present invention.
Figure 3:
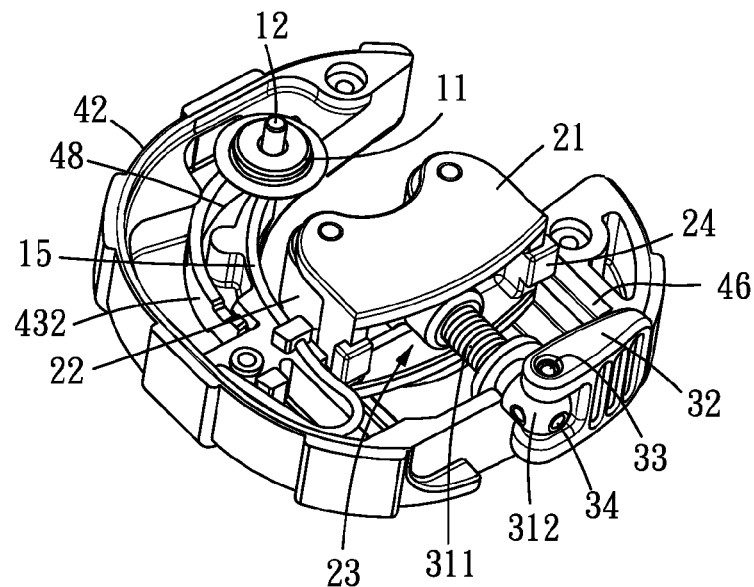
FIG. 3 is an internal perspective view of the pipe cutter according to the present invention.
Figure 4:
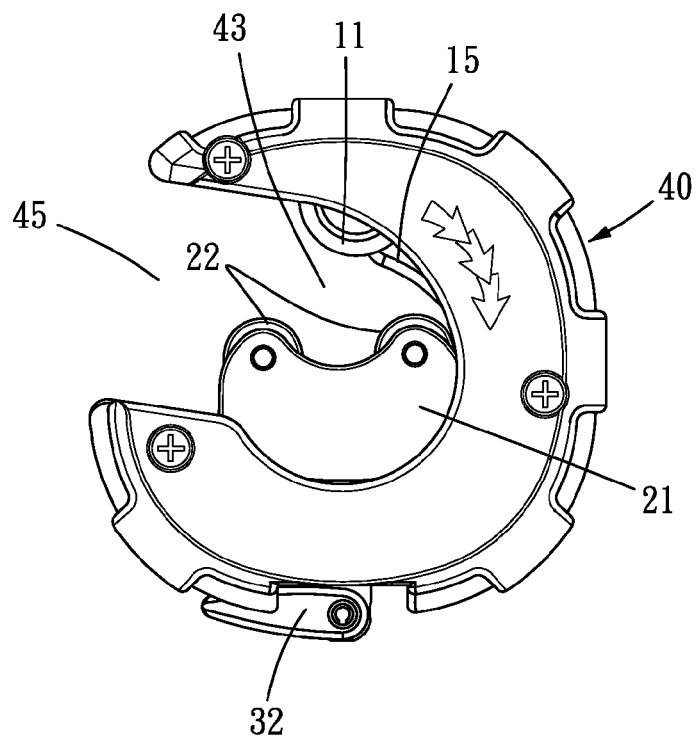
FIG. 4 is the first top view of the pipe cutter according to the present invention.

Referring then to FIGS. 2 and 3, two arc-shaped guide plates 431 and 432 are fixed inside the first casing body 41 and the second casing body 42. The knife axle guiding channel 48 is formed between the inner side walls of the first casing body 41 and the second casing body 42 and the guide plates 431 and 432. This knife axle guiding channel 48 provides the disc knife set 10 with an arc-shaped path of entry and withdrawal, and facilitates the adaptation of the disc knife 11 to the metal pipe 50 with different diameters.

FIGS. 1 to 7 illustrate the microstructure of the fixed-rotating shaft lever 31 and the rotating operation component 32. The fixed-rotating shaft lever 31 is connected with the rotating operation component 32 with the bolt 33 piercing through its spherical end 312. In the preferred embodiment of the present invention the rotating operation component 32 is a sheet structure, thereon is disposed a positioning component 35 corresponding to the spherical end. On the spherical end 311 are disposed a plurality of receiving components 34 to receive the positioning component 35. In the preferred embodiment of the present invention the positioning component 35 is a round ball and the receiving components 34 are semi-circular cavities. The rotating operation component 32 can rotate along the axle of the bolt 33 and change the angle of its intersection with the fixed-rotating shaft lever 31, for example 90° or 180°. In addition, when the rotating operation component 32 is at either of the two positions, the positioning component 35 (round ball) will be united with the receiving component 34 (semi-circular cavity) and help hold the rotating operation component 32 steady.

As FIGS. 5 and 6 suggest, when the fixed-rotating shaft lever 31 and the rotating operation component 32 intersect with each other at 180°, it is easy for the operator to apply force and turn the rotating operation component 32, driving the fixed-rotating shaft lever 31 to rotate and thereby controlling the linear movement of the roller base 21.

Figure 7:
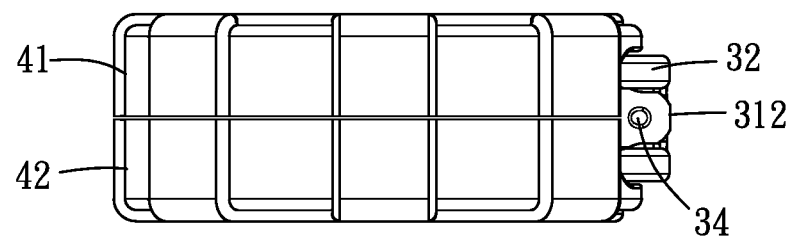
FIG. 7 is the first side view of the pipe cutter according to the present invention.
Figure 8:
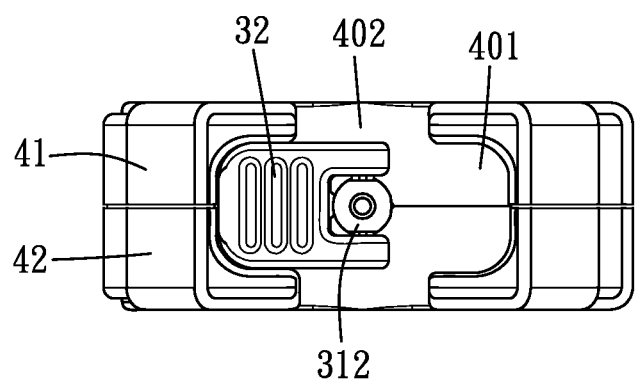
FIG. 8 is the second side view of the pipe cutter according to the present invention.

As FIGS. 7 and 8 illustrates, on the external wall of the main body 40 adjacent to the rotating operation component 32 are disposed a first positioning slot 401 parallel to the circumference of the external wall and a second positioning slot 402 at right angle to the external wall. As mentioned above, when the fixed-rotating shaft lever 31 is driven by the rotating operation component 32, the rotating operation component 32 should be at 180° to the fixed-rotating shaft lever 31 for the convenience of force application. After the rotating operation is finished, the rotating operation component 32 should be turned to intersect with the fixed-rotating shaft lever 31 at right angle. For this, the first positioning slot 401 and the second positioning slot 402 are designed to contain the rotating operation component 32, so that no object protrudes outward in the diameter direction and the pipe cutter is easy to grip and operate. When the rotating operation component 32 is parallel to the circumference of the external wall of the main body 40, it can be contained in the first positioning slot 401. When the rotating operation component 32 is at right angle to the circumference of the external wall of the main body 40, it can be contained in the second positioning slot 402.

The pipe cutter according to the present invention is of a circular shape to facilitate gripping and rotating. The pipe receiving space 43 of the pipe cutter can receive a metal pipe 50 and restrain it between the disc knife 11 and the rollers 22. The disc knife moves and returns in a preset path under the action of the flexible component 15. The disc knife 11 can firmly bite into the surface of the metal pipe 50, cutting it off as the knife rolls and rotates. The action of the flexible component 15 drives the disc knife 11 deeper and deeper inside the pipe wall in the process of roll cut, achieving the objective of automatically driving the knife forward to perform the cutting. Two rollers 22 are disposed inside the roller base 21, which moves linearly under the control of a driving assembly 30. The linear movement of the roller base 21 adjusts the relative distance between the rollers 22 and the disc knife 11, adapting the pipe cutter to receive metal pipes with various diameters within a preset range. The disc knife 11 and the two rollers 22 can firmly hold and restrain the metal pipe 50, with the knife driving steadily forward to perform cutting. Besides, in comparison with existing portable pipe cutters with extended grip handles, the pipe cutter according to the present invention is lighter and easier to carry.

While the invention has been described with reference to a preferred embodiment thereof, it is to be understood that modifications or variations may be easily made without departing from the spirit of this invention, which is defined in the appended claims.

What is claimed is:
1. A portable pipe cutter comprising:
a disc knife set including a disc knife;

a roller set including a roller base and two rotatable rollers disposed in front of the roller base;

a driving assembly including a fixed-rotating shaft lever and a rotating operation component connected to one end of the fixed-rotating shaft lever;

a main body including a pipe receiving space in a middle thereof and an opening connected with the pipe receiving space; wherein the disc knife set and the roller set are disposed with a knife-edge of the disc knife partially protruding into the pipe receiving space; wherein the fixed-rotating shaft lever pierces through a side wall of the main body and connects with the roller base; and wherein the rotating operation component is disposed on an exterior of the main body; and a conversion module connecting the driving assembly, the main body, and the roller set;

wherein a rotation of the rotating operation component is converted into a linear movement of the roller set;

wherein the disc knife set further includes a knife axle piercing through a center of the disc knife;

wherein inside the main body is disposed a knife axle guiding channel, therein both ends of the knife axle are disposed;

wherein the knife axle guiding channel is an arc-shaped path;

wherein two arc-shaped guide plates are fixed inside the main body one above and one below; and wherein an inner side wall of the main body and the guide plates form the knife axle guiding channel.

2. The portable pipe cutter as defined in claim 1, wherein the conversion module includes the roller base bolted with the fixed-rotating shaft lever, and at least one matching set of slot and guide block disposed where the roller set touches the exterior of the main body to restrain the rotation of the roller base.

3. The portable pipe cutter as defined in claim 1, wherein a flexible component is also disposed with one end thereof fixed inside the main body and the other end thereof extending to touch the knife axle.

4. The portable pipe cutter as defined in claim 1, wherein an external wall of the main body adjacent to the rotating operation component is disposed at a first positioning slot parallel to a circumference of the external wall of the main body to contain the rotating operation component parallel to the external wall of the main body; and wherein on the external wall of the main body adjacent to the rotating operation component are disposed a second positioning slot at a right angle to the circumference of the external wall of the main body to contain the rotating operation component at the right angle to the external wall of the main body.

* * * * *